US012636832B2

(12) United States Patent
Rouby et al.

(10) Patent No.: US 12,636,832 B2
(45) Date of Patent: May 26, 2026

(54) 3D PRINTER MACHINE EQUIPPED WITH A TRANSPARENT SECONDARY CHAMBER ALLOWING MANUFACTURE IN A CONTROLLED ATMOSPHERE

(71) Applicant: COMPAGNIE GENERALE DES ETABLISSEMENTS MICHELIN, Clermont-Ferrand (FR)

(72) Inventors: Mickael Rouby, Clermont-Ferrand (FR); Clement Nagode, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/703,247

(22) PCT Filed: Oct. 14, 2022

(86) PCT No.: PCT/FR2022/051944
§ 371 (c)(1),
(2) Date: Apr. 19, 2024

(87) PCT Pub. No.: WO2023/067271
PCT Pub. Date: Apr. 27, 2023

(65) Prior Publication Data
US 2025/0229489 A1 Jul. 17, 2025

(30) Foreign Application Priority Data
Oct. 21, 2021 (FR) ........................................ 2111177

(51) Int. Cl.
*B33Y 30/00* (2015.01)
*B29C 64/232* (2017.01)
(Continued)

(52) U.S. Cl.
CPC ............ *B29C 64/25* (2017.08); *B29C 64/232* (2017.08); *B29C 64/245* (2017.08); *B29C 64/295* (2017.08); *B33Y 30/00* (2014.12)

(58) Field of Classification Search
None
See application file for complete search history.

(56) References Cited

U.S. PATENT DOCUMENTS 6,722,872 B1 * 4/2004 Swanson ............... B29C 64/112
425/375
7,297,304 B2 11/2007 Swanson et al.
(Continued)

FOREIGN PATENT DOCUMENTS

CN 112026171 A 12/2020
EP 3339002 A1 6/2018
(Continued)

OTHER PUBLICATIONS

International Search Report dated Jan. 26, 2023, in corresponding PCT/FR2022/051944 (6 pages).

*Primary Examiner* — Mohammad M Ameen
(74) *Attorney, Agent, or Firm* — VENABLE LLP

(57) ABSTRACT

A three-dimensional printing machine (1) comprises a main chamber (2) which is delimited by a first wall (3) and inside which there are a main platform (5), intended to support a part (4) being printed, and a nozzle (6) designed to supply and deposit a printing material (7) in successive layers, the first wall (3) having at least one transparent main observation window (11), the main chamber (2) containing a secondary chamber (20) which is delimited by a telescopic second wall (21) provided with an insertion orifice (22), through which the nozzle (6) enters the secondary chamber (20), and a transparent secondary observation window (23) allowing an observer (25) stationed outside the main cham- (Continued)

ber (2) to view the part being printed in the secondary chamber (20).

9 Claims, 4 Drawing Sheets

(51) Int. Cl.
  *B29C 64/245* (2017.01)
  *B29C 64/25* (2017.01)
  *B29C 64/295* (2017.01)

(56) References Cited

U.S. PATENT DOCUMENTS

| | | | |
|---|---|---|---|
| 2004/0104515 A1 | 6/2004 | Swanson et al. | |
| 2018/0169971 A1* | 6/2018 | Rupel | B33Y 10/00 |
| 2020/0147878 A1 | 5/2020 | Lee et al. | |

FOREIGN PATENT DOCUMENTS

| | | |
|---|---|---|
| EP | 3650201 A1 | 5/2020 |
| KR | 10-1843323 B1 | 3/2018 |

* cited by examiner

3D PRINTER MACHINE EQUIPPED WITH A TRANSPARENT SECONDARY CHAMBER ALLOWING MANUFACTURE IN A CONTROLLED ATMOSPHERE

BACKGROUND

The present invention relates to the general field of three-dimensional printing machines which make it possible to manufacture parts in a wide variety of shapes by depositing a malleable printing material in successive layers, by means of a nozzle.

Such machines are notably described by document U.S. Pat. No. 6,722,872, which proposes a printing machine comprising a chamber which forms an oven delimited by a wall, and inside which there is a platform intended to support the part being printed, and also the nozzle for feeding the constituent material of said part. In order to be able to create the shape of the part, what is provided is a drive system comprising a lift for vertically moving the platform, and intersecting translational-displacement stages for horizontally steering the nozzle charged with delivering the constituent material of the part. Said translational-displacement stages are equipped with gaiters which ensure the leaktightness of the chamber.

Although such machines are satisfactory overall, they have a certain complexity, notably linked to the members of the drive system and to the corresponding sealing members.

Moreover, such machines have a certain thermal inertia, such that raising the temperature of the oven, and then maintaining the temperature of said oven during the printing operation, can consume a lot of energy.

In some cases, the means for heating the oven can even be insufficient to implement certain printing materials that require an elevated temperature to ensure the successive layers of printing material in question come together well, this then limiting the industrial capacities of the machine.

Furthermore, it is sometimes difficult to ensure effective and reliable monitoring of the part and the proper progression of the printing process. In particular, the integration of a camera in the oven is potentially problematic because of the size of the camera and especially the sensitivity of the optical unit and electronics of said camera to heat, thereby also limiting the temperature level accessible to the machine.

The subject matter assigned to the invention consequently aims to overcome the aforementioned drawbacks and propose a new three-dimensional printing machine which makes it possible, using a compact and inexpensive machine, to perform printing in a wide range of temperatures, including elevated temperatures, while still ensuring effective control of the printing process by virtue of practical and reliable monitoring of the part being printed.

SUMMARY

The subject matter assigned to the invention is reached by means of a three-dimensional printing machine comprising a main chamber which is delimited by a first wall and inside which there are a main platform, intended to support a part being printed, and a nozzle designed to supply and deposit a printing material in successive layers in order to gradually build up said part supported by the main platform, said machine also comprising a drive system for controlling a relative movement of the main platform relative to the nozzle in order that said nozzle can trace the shape of the part, and the first wall having at least one main observation window which is transparent over at least part of the visible light spectrum and which allows an observer stationed outside the main chamber to view the main platform, said machine being characterized in that the main chamber contains a secondary chamber of which the volume is strictly less than that of the main chamber and which is delimited by a second wall borne by the main platform, said second wall separating said secondary chamber from the main chamber and having, for the one part, at least one insertion orifice through which the nozzle enters the secondary chamber in order to be able to deposit the printing material there and thus create said part within said secondary chamber and, for the other part, at least one secondary observation window, which is transparent over at least part of the visible light spectrum and is placed facing the main observation window, such that an observer stationed outside the main chamber can view the interior of the secondary chamber and the part which is being printed in said secondary chamber by direct ocular observation along an optical pathway which passes successively through the main observation window and then the secondary observation window.

Advantageously, the secondary chamber according to the invention makes it possible to confine the working area where the nozzle constructs the part to a volume which is smaller than that of the main chamber, and the temperature of which consequently can be precisely controlled more easily, while still preserving perfect visual monitoring of the printing process, since the second wall which delimits the secondary chamber, and more particularly the second observation window integrated in said wall, advantageously screens transfers of heat but not vision.

From a thermal perspective, the reduced volume of the secondary chamber, and the partitioning afforded by the second wall which delimits said secondary chamber, advantageously make it possible to bring the interior of the secondary chamber to an elevated temperature with low energy expenditure, without it being necessary to bring all of the main chamber, which surrounds said secondary chamber, to a similarly elevated temperature, and additionally without thermally affecting the mechanical or electronic members of the machine, and notably the members of the drive system, which can preferably be located outside the secondary chamber but, where appropriate, inside the main chamber.

Moreover, the relative arrangement of the observation windows according to the invention advantageously preserves a wide field of vision for observing the part and thus allows the user to directly visually monitor the process in a way which is particularly economic and reliable, without it being necessary to use a camera circuit.

BRIEF DESCRIPTION OF THE FIGURES

Further subject matter, features and advantages of the invention will become apparent in greater detail upon reading the following description, and with the aid of the appended drawings, which are provided purely by way of non-limiting illustration, in which.

DETAILED DESCRIPTION

The present invention relates to a three-dimensional printing machine 1.

Figure 4:
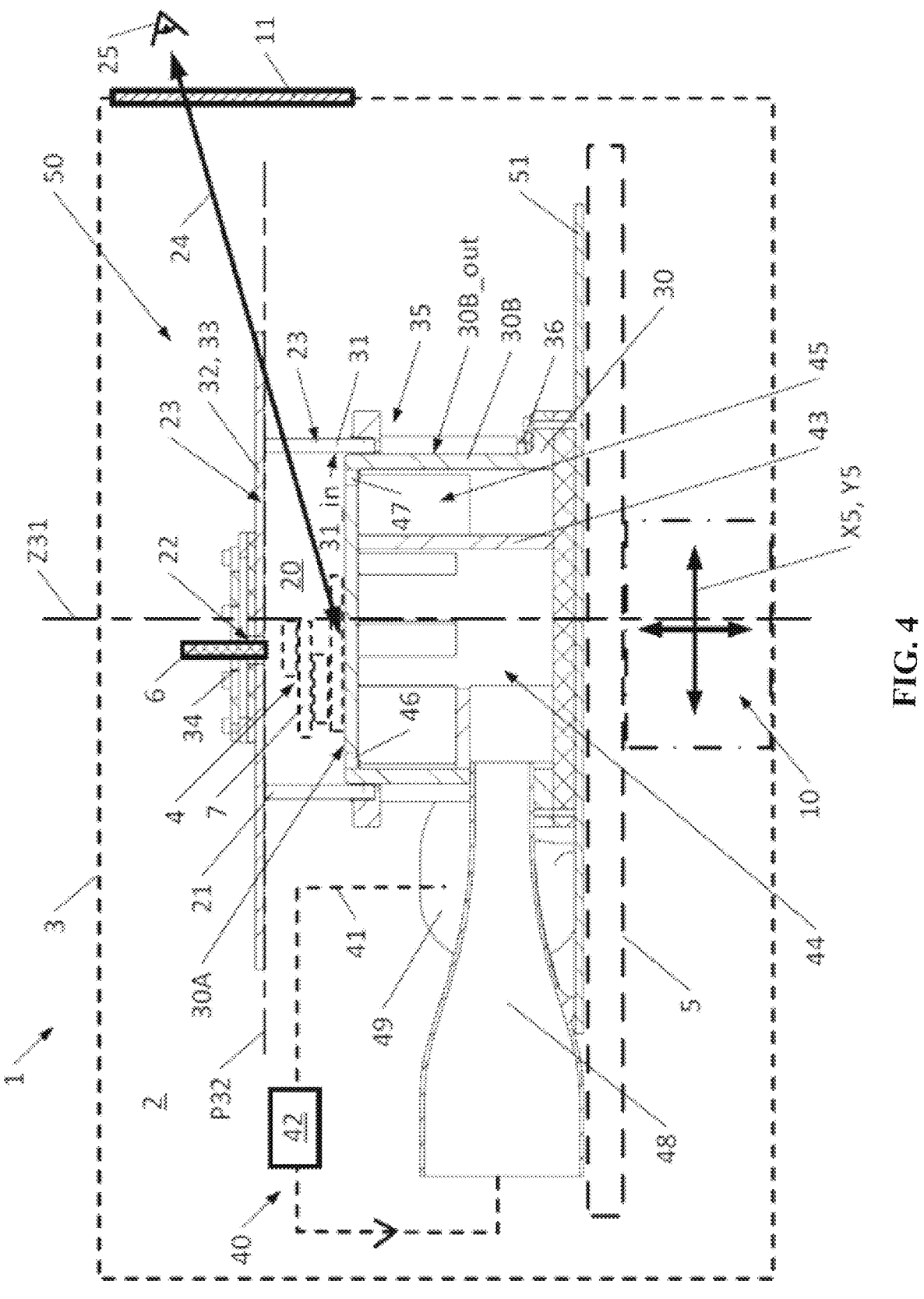
FIG. 4 shows a schematic face-on view, in section in a vertical plane, of a machine according to the invention equipped with a module according to FIGS. 1 to 3.
Figures 5A, 5B, 5C:
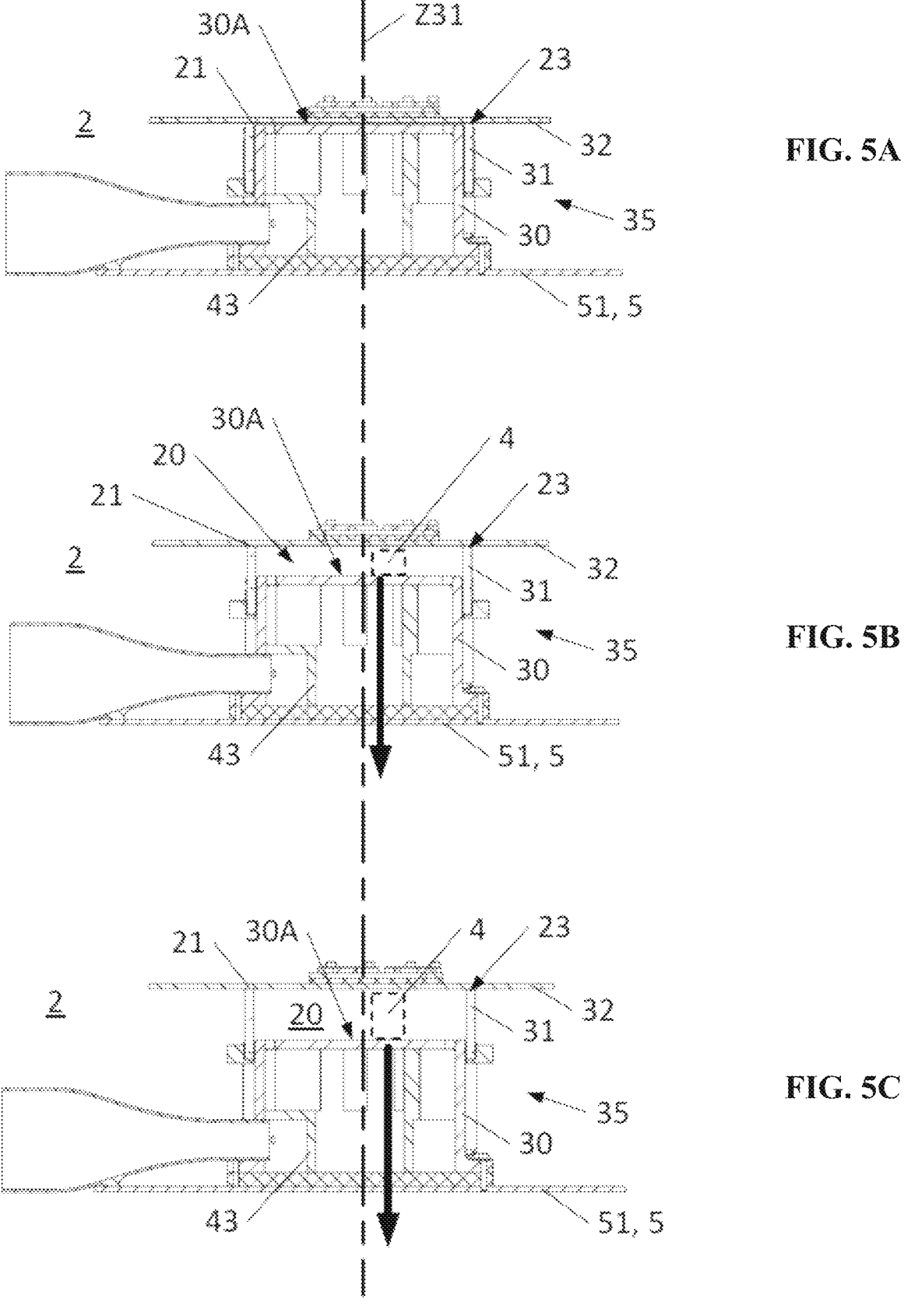
FIGS. 5A, 5B and 5C show partial views, in section in a vertical plane, of the gradual descent of the main platform of the machine in FIG. 4 as the part is being printed and the corresponding compensation performed by the telescopic sliding of the second wall which delimits the secondary chamber, with FIG. 5A corresponding to the starting configuration, where the main platform is in the top position, FIG. 5B corresponding to an intermediate configuration, where the main platform has been lowered from its starting position, and FIG. 5C corresponding to the end-of-travel configuration, where the main platform is in the bottom position, that is to say maximally lowered.

As can be seen in FIG. 4, said machine 1 comprises a main chamber 2 which is delimited by a first wall 3.

The main chamber 2 thus forms a closed chamber, inside which the operation for printing a part 4 will take place.

Inside the main chamber 2 there is a main platform 5, which is intended to support a part 4 being printed.

Said main platform 5 preferably forms a planar and horizontal surface in a manner known per se.

Inside said main chamber 2 there is also a nozzle 6 which is designed to supply and deposit a printing material 7 in successive layers in order to gradually build up said part 4 supported by the main platform 5.

Any material which can be made malleable enough to enter the nozzle 6, can adhere to itself in superposed layers, and then harden after having been deposited will be suitable as printing material 7.

The printing material 7 will preferably be a thermoplastic material, which will be softened or even melted, for example by extrusion, for application by the nozzle 6.

The printing material 7 will preferably be deposited in the form of a continuous ribbon ejected by the nozzle 6.

The main chamber 2 and, where appropriate, the nozzle 6 and/or the main platform 5 will comprise heating means (not shown) for increasing the temperature of the main chamber 2 and, where appropriate, the nozzle 6 and/or the main platform 5 in order to ensure the malleability of the printing material 7 and, especially, good adhesion between the various layers of said printing material 7 which are successively deposited to form the part 4.

As can be seen in FIG. 4, the machine 1 also comprises a drive system 10 which makes it possible to control a relative movement of the main platform 5 with respect to the nozzle 6 in order that said nozzle 6 can trace the shape of the part 4.

The movement system 10 will preferably be designed to provide the main platform 5 with at least three degrees of freedom relative to the nozzle 6, specifically a degree of freedom in vertical translation, and two degrees of freedom in horizontal translation, along two mutually perpendicular horizontal axes X5, Y5, such that it is possible to move the nozzle 6 relative to the main platform 5 (and vice versa) in the three spatial directions.

The drive system 10 could thus be designed to be able to move just the nozzle 6 in the three degrees of freedom relative to a main platform 5 which would be fixed relative to the frame of the machine 1 and thus relative to the main chamber 2, or else by contrast to be able to move just the main platform 5 in the three degrees of freedom relative to a nozzle 6 which would be fixed relative to the frame and to the main chamber 2, or else to distribute the degrees of freedom between the nozzle 6 for the one part and the main platform 5 for the other part, for example by arranging to provide the main platform 5 with a single degree of freedom in vertical translation relative to the frame and to the main chamber 2 whereas the nozzle 6 is movable in the two horizontal directions relative to this same frame and to the main chamber 2, or conversely to provide the nozzle 6 with a single degree of freedom in vertical translation whereas the main platform 5 is movable exclusively in the two horizontal degrees of freedom.

Irrespective of the configuration chosen, the degrees of freedom in translation could be ensured by any suitable motorized guiding means.

The degree of freedom in vertical translation could thus be realized by means of a lift, comprising for example a portal frame provided with screws which extend vertically and interact with ball bearing sleeves fixed to the member in question that is to be guided, in this case for example the main platform 5.

The degrees of freedom in horizontal translation could notably be realized by means of intersecting translational-displacement stages comprising carriages guided on horizontal rails and moved for example by a ball-screw system driven by a motor.

The drive system 10, and more particularly each axis of translation, will preferably be driven by electric motors, preferably controlled by an electronic control unit.

Furthermore, the first wall 3, which delimits the main chamber 2, has at least one main observation window 11 which is transparent over at least part of the visible light spectrum, more preferably over all of the visible spectrum, and allows an observer stationed outside the main chamber 2 to view the main platform 5 and therefore, where appropriate, the part 4 being printed, which is located on said main platform 5.

"Visible spectrum", by convention, refers to the wavelength range which extends from 380 nm, the limit of ultraviolet radiation, to 780 nm, the limit of infrared radiation.

"Transparent", by convention, refers to an observation window 11, or more generally any element whatsoever that, for the one or more wavelengths in question, has a transmittance T, that is to say a ratio between, as denominator, the light intensity $I0$ of an incident beam which reaches this element to, as numerator, the intensity I of the corresponding transmitted light beam which emerges from this element by transmission, which is equal to or greater than 25%, i.e.: $T=I/I0 \geq 25\%$, and is for example between 50% and 95%.

Equivalently, it would be possible to consider as "transparent" an observation window of which the optical density DO, which is equal to the negative value of the common logarithm of the inverse of the transmittance T: $DO=-\log_{10}(T)=-\log_{10}(I/I0)$, is less than or equal to 0.6, and is for example between 0.02 and 0.3.

By way of reference, in the case of a perfectly transparent element for which the intensity of the transmitted light beam is equal to the intensity of the incident light beam, the transmittance is 1 and the optical density DO is zero.

Conversely, a perfectly opaque element will exhibit zero transmittance and infinite optical density.

The transparency of the main observation window 11 will advantageously be sufficient to allow the observer to clearly distinguish the contours of the object observed, in this instance the main platform 5 and/or the part 4 borne by said main platform 5, through said main observation window 11.

The main observation window 11 will preferably be formed by a transparent panel integrated in a door which is formed in the first wall 3 in order to give access to the main chamber 2 and to the main platform 5 when said door is open and to keep the main chamber 2 closed when said door is closed.

The main observation window 11 will be able to be made from, for example, glass, acrylic, polycarbonate or PMMA ("plexiglas"), with a thickness of between 3 mm and 10 mm.

The constituent material of the main observation window 11 will moreover preferably be colourless.

According to the invention, the main chamber 2 contains a secondary chamber 20 of which the volume is strictly less than the volume of the main chamber 2 and which is delimited by a second wall 21 borne by the main platform 5.

By way of indication, the overall internal volume of the secondary chamber 20, such that said volume is delimited by the envelope which embodies the second wall 21, is preferably between 200 cm3 and 600 cm3.

The second wall 21 separates said secondary chamber 20 from the main chamber 2 and has, for the one part, at least one insertion orifice 22 through which the nozzle 6 enters the secondary chamber 20 in order to be able to deposit the printing material 7 in said secondary chamber 20 and thus create the part 4 within said secondary chamber 20 and, for the other part, at least one secondary observation window 23, which is transparent over at least part of the visible light spectrum, preferably over all of the visible light spectrum, and is placed facing the main observation window 11, such that an observer 25 stationed outside the main chamber 2 can view the interior of the secondary chamber 20 and the part 4 which is being printed in said secondary chamber 20 by direct ocular observation along an optical pathway 24 which passes successively through the main observation window 11 and then the secondary observation window 23.

The second wall 21 advantageously makes it possible to separate the secondary chamber 20 from the atmosphere which prevails in the main chamber 2 and therefore surrounds the second wall 21 on the outside of the secondary chamber 20.

The volume of the secondary chamber 20 is preferably entirely contained inside the main chamber 2 which encloses said secondary chamber 20, said secondary chamber 20 thus being strictly incorporated inside the main chamber 2.

In this way, at least one portion, or even all, of the second wall 21 is set back from the first wall 3, towards the inside of the main chamber 2.

Advantageously, as indicated above, the use of the secondary chamber 20 according to the invention makes it possible to reduce and confine the working area, in which the nozzle 6 operates as it manufactures the part 4, inside a closed volume which is strictly smaller than the total volume available in the main chamber 2, and thus has a fraction of said total volume available in the main chamber 2, in order to better control the conditions in which said part 4 is printed, notably the temperature.

Advantageously, the arrangement of the observation windows 11, 23 according to the invention enables direct monitoring, with the naked eye and without a camera, of the interior of the secondary chamber 20 and thus the printing process taking place inside said secondary chamber 20.

The addition of the secondary chamber 20 according to the invention therefore will not have the effect of concealing the working area from the observer or degrading the quality of the monitoring of the process.

Placing a mirror in the optical pathway 24, for example in that portion of said optical pathway 24 that is comprised between the main observation window 11 and the secondary observation window 23, is ultimately not excluded.

However, the main observation window 11 and the secondary observation window 23 will preferably be directly in line with one another, in order to make the interior of the secondary chamber 20 visible from the outside of the main chamber 2, and therefore from the outside of the machine 1, along a rectilinear optical pathway, without using a mirror. Specifically, such a structure will be particularly simple and enable very intuitive visual monitoring.

In the same way as the main observation window 11, the secondary observation window 23 will preferably have, over at least part and preferably over all of the visible light spectrum, a transmittance T equal to or greater than 25%, preferably of between 50% and 95%.

The secondary observation window 23, which will preferably be particularly resistant to heat, will be able to be made for example from glass, tempered glass, or borosilicate glass ("Pyrex"), with a thickness of between 3 mm and 10 mm.

The constituent material of the secondary observation window 23 will moreover preferably be colourless.

With preference, and as illustrated in FIGS. 1, 3, 4, 5A, 5B and 5C, the second wall 21 comprises:
  i) a pedestal 30 which bears vertically against the main platform 5 and has a horizontal receiving face 30A intended to support the part 4 being printed,
  ii) a sleeve 31 which forms a lateral wall extending vertically from the receiving face 30A of the pedestal, along a closed contour around a vertical central axis Z31 normal to said receiving face 30A, and at least one portion of which forms the secondary observation window 23, and
  iii) a cover 32 which caps the sleeve 31 at a vertical distance from the horizontal receiving face 30A of the pedestal 30, so as to close the secondary chamber 20, and which has the insertion orifice 22 which allows the nozzle 6 to be engaged inside said secondary chamber 20.

Such a structure notably has the advantage of being very simple to implement at low cost, and gives good visibility of the working area, i.e. the closed space of the secondary chamber 20 which extends between the pedestal 30, the cover 32 and the sleeve 31, which vertically connects said pedestal 30 to said cover 32 and forms the radial limit of said secondary chamber 20 with respect to the central axis Z31.

The sleeve 31 advantageously sealingly interacts with the pedestal 30 and with the cover 32, in order to separate the atmosphere prevailing in the secondary chamber 20 from the surrounding atmosphere that prevails in the main chamber 2 and bathes the secondary chamber 20.

It should be noted that the cover 32 will also preferably be at least partially, or even completely, transparent in order to form a portion of the secondary observation window 23, complementing the portion of the secondary observation window 23 formed by the sleeve 31. In this way, the cover could comprise a transparent disc 33, in this instance disposed horizontally and placed on the upper edge face of the sleeve 31.

The material used and the transparency of the cover 32, and more particularly of the transparent disc 33, could be identical to those already specified above with reference to the sleeve 31.

Advantageously, the implementation of a transparent cover 32 will further improve the visibility of the interior space of the secondary chamber 20 and consequently of the contents of said secondary chamber from various angles of observation from the outside of the main chamber 2.

Figure 1:
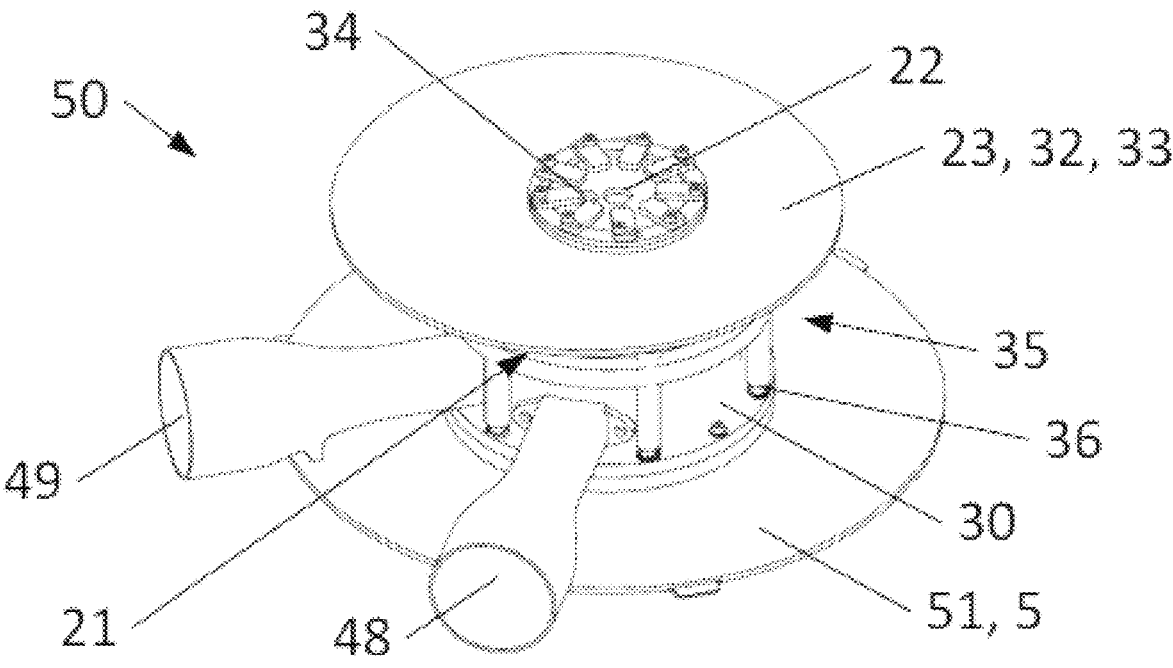
FIG. 1 shows a perspective view of a module intended to equip the main platform of a three-dimensional printing machine to integrate a secondary chamber according to the invention in said machine.
Figure 2:
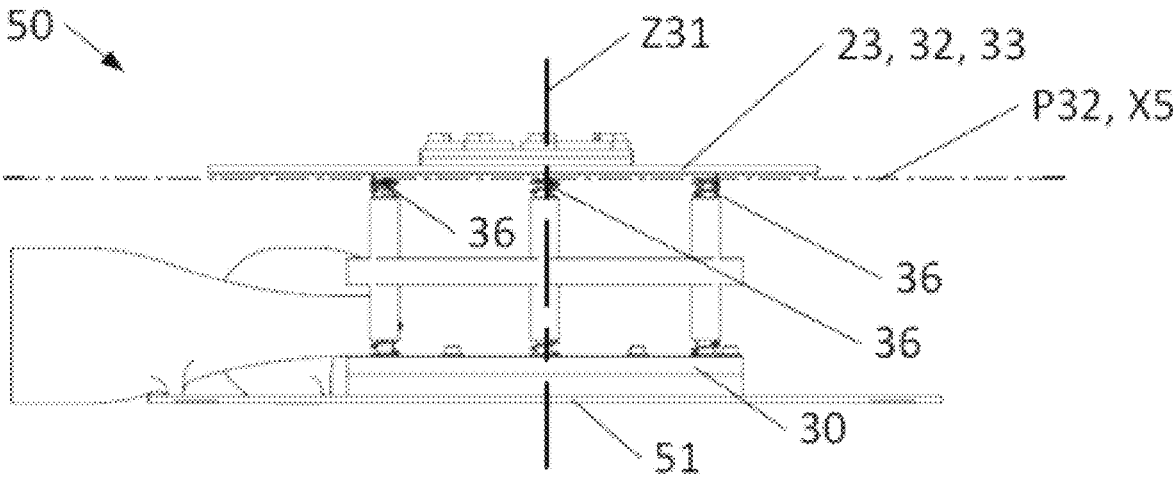
FIG. 2 is a face-on projection of the module in FIG. 1.

The insertion orifice 22 could be made through the cover 32, and more particularly through the transparent disc 33, preferably substantially along the direction of the central axis Z31, as can be seen in FIGS. 1 and 4, such that the nozzle 6 points into the secondary chamber 20 from above, towards the pedestal 30, and more particularly towards the receiving face 30A of said pedestal 30, which will receive the successive layers of the printing material 7 that are deposited by the nozzle 6.

A clamping mechanism 34 will make it possible to fix the nozzle 6 to the cover 32.

Figure 3:
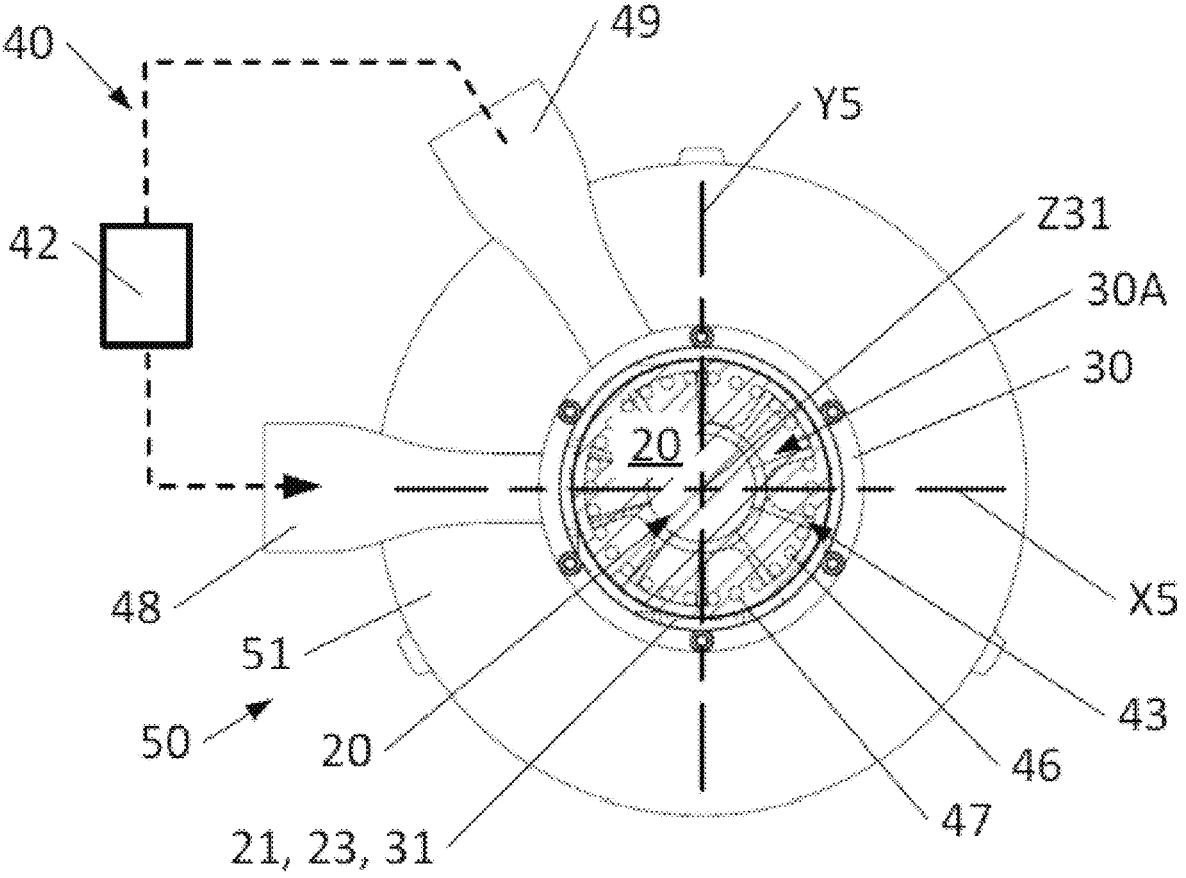
FIG. 3 is a top view, in section in a horizontal plane, of the module in FIGS. 1 and 2.

With preference, as can be clearly seen in FIGS. 1 and 3, the sleeve 31 forms a ring, which ring is transparent over at least 180 degrees, preferably at least 270 degrees, and more preferably over 360 degrees about the central vertical axis Z31.

Said ring will preferably have a circular base, and even more preferably will form a straight cylinder with a circular base.

According to a preferred embodiment variant, the sleeve 31 will be formed in one piece from a transparent material.

By using a sleeve 31 which is transparent around most, or even around all, of its periphery, optimum visibility will advantageously be obtained, since the secondary observation window 23 thus offers a very wide field of view.

The drive system 10 preferably makes it possible to move the main platform 5, and consequently the pedestal 30, in translation along the vertical central axis Z31 relative to the cover 32.

This notably makes it possible to lower the main platform 5, and therefore the receiving face 30A of the pedestal borne by said main platform 5, relative to the nozzle 6 and therefore to move the receiving face 30A away from the nozzle 6 as the layers of printing material 7 deposited on said receiving face 30A by the nozzle 6 are stacked and therefore as the height of the part 4 being printed increases.

As indicated above, the drive system 10 could comprise a lift for moving the main platform 5 vertically. This lift could be positioned in the main chamber 2, between the main platform 5 and the first wall 3.

According to a preferred feature, which can constitute a completely separate invention, notably independently of the presence or absence of transparent observation windows 11, 23 and therefore independently of the transparent or not transparent nature of the sleeve 31 or of the cover 32, the sleeve 31 can then form, with the pedestal 30, as can be clearly seen in FIGS. 4, 5A, 5B and 5C, a telescopic structure 35, and be preloaded by one or more springs 36 towards said cover 32, such that said sleeve 31 can slide relative to the pedestal 30 along the vertical central axis Z31 and stay abuttingly pressed against the cover 32, and therefore more particularly in sealed contact with said cover 32, while the main platform 5, and therefore the pedestal 30, is moved relative to the cover 32, and notably away from the cover, in translation along said vertical central axis Z31.

Advantageously, this simple telescopic structure 35 makes it possible to preserve the confinement of the secondary chamber 20 by adapting the height of the lateral wall of the secondary chamber in real time by way of a differential translational movement of the sleeve 31 relative to the pedestal 30, irrespective of the vertical distance between the pedestal 30 and the cover 32.

Advantageously, the sleeve 31 is coaxially and slidingly nested with a drum 30B of the pedestal 30, which has a cylindrical shape matching that of the radially inner face 31_in of the sleeve 31 and guides the vertical translational displacement of said sleeve 31 relative to the pedestal 30.

The sleeve 31 is formed by a stiff ring which advantageously keeps its shape, without deformation, during the vertical movements of the main platform 5 and of the pedestal 30, since the lowering of the main platform 5 and the pedestal 30 is compensated by a corresponding rise, in vertical translation, of the sleeve 31 which is moved by one unit relative to the pedestal 30. Any wear of the sleeve 31, and more generally of the second wall 21 and of the secondary observation window 23, owing to deformation is thus avoided.

A slight radial play will be provided between the radially outer face 30B_out of the drum 30B and the radially inner face 31_in of the sleeve 31, in order to enable the relative sliding of the sleeve 31 over the drum 30B, and in order to avoid abrasion phenomena liable to scratch the sleeve 31 and thus the secondary observation window 23.

To ensure the leaktightness of the connection between the drum 30 and the sleeve 31, it would be possible for example either to provide simply that the radial play between these elements is particularly narrow, or add one or more seals, for example O rings or lip seals, which will be interposed between the radially outer face 30B_out of the drum 30B and the radially inner face 31_in of the sleeve.

The drive system 10 is preferably designed to be able to generate a relative movement of the main platform 5, and consequently of the pedestal 30, with respect to the cover 32 along a first horizontal axis X5 and along a second horizontal axis Y5 perpendicular to the first horizontal axis X5.

To this end, for example, it would be possible to use intersecting translation stages, as mentioned above, which could be located in the main chamber 2 or even outside said main chamber 2.

The cover 32, which bears the nozzle 6, preferably interacts with the sleeve 31 with horizontal planar contact, such that said cover 32 can slide relative to said sleeve 31 in a horizontal plane P32 parallel to each of the first and second horizontal axes X5, Y5, while still staying in contact with said sleeve 31 and thus keeping the secondary chamber 20 closed, during the horizontal relative movements of the main platform 5 with respect to the cover 32 and to the nozzle 6.

Advantageously, the continuity of the confinement and of the leaktightness of the secondary chamber 20 could thus be ensured by means of a robust and simple structure.

The diameter of the cover 32, and more particularly of the transparent disc 33, will of course be adapted to not only cover the overall diameter of the sleeve 31 but also project beyond the radially outer wall of the sleeve 31 to a degree which is at least equal to the maximum possible horizontal travel of the main platform 5 along the horizontal axes X5, Y5.

The leaktightness between the upper edge face of the sleeve 31 and the bottom of the cover 32 placed flat on said sleeve 31 could be ensured, for example, either by way of the simple, smooth and robust contact between the cover 32 and the sleeve 31, possible leaks then being negligible, or by the addition of an O ring accommodated in an annular groove cut in the edge face of the sleeve 31.

With particular preference, the nozzle 6 and the cover 32 are fixed relative to the first wall 3, and more generally relative to the frame of the machine 1, and the main platform 5 performs all of the movements necessary to manufacture the part 4, specifically both the two, separate or combined, movements along the two horizontal axes X5, Y5 and also the third movement along the vertical axis (equated to the central axis Z31 for convenience), relative to the fixed nozzle 6.

The machine 1 preferably comprises an atmosphere controlling circuit 40 which makes it possible to place the secondary chamber 20 under a controlled atmosphere, the composition and/or the temperature of which differ from those of the primary atmosphere prevailing in the main chamber 2, the second wall 21 to this end providing leaktight separation (impermeable to the gases of which said atmospheres are composed) between the secondary chamber 20 and the main chamber 2.

It would notably be possible for an inert gas, such as dinitrogen, or any other suitable gas or gaseous mixture, which will be carried by the circuit 40 under the desirable temperature, pressure and flow rate conditions, to be used in the secondary chamber.

The atmosphere controlling circuit 40 preferably forms a closed recirculation loop 41, at least one part of which is outside the secondary chamber 20.

The same gaseous mixture can thus be successively injected into the secondary chamber 20, to condition its atmosphere, then extracted from the secondary chamber 20 and then re-treated, and notably heated and/or filtered, to then be reinjected into the secondary chamber 20, and so on.

Precise and effective control of the conditions in which the part 4 is created is thus realized with low energy expenditure.

Advantageously, having part of the circuit 40, notably the recirculation loop 41, project out of the secondary chamber 20, for example by positioning said part of the circuit in the main chamber 2 or even outside the main chamber 2, makes it possible to maximize the useful volume available within the secondary chamber 20.

The atmosphere controlling circuit 40 preferably comprises a heating apparatus 42 for raising the temperature prevailing inside the secondary chamber 20.

Said heating apparatus 42 is preferably specific to the circuit 40, and notably separate from the possible heating means of the main chamber 2 or of the nozzle 6, in order to act specially on the temperature of the secondary chamber 20.

Ultimately, said heating apparatus 42 could be located in the secondary chamber 20.

However, for convenience of mounting and to preserve the useful volume of the secondary chamber 20, said heating apparatus 42 will preferably be located on that portion of the recirculation loop 41 that is outside the secondary chamber 20.

The heating apparatus 42 could be formed by a heating tube, such as a ceramic tube which is provided with electrical heating resistors and through which the gaseous flow trapped in the recirculation loop 41 and the secondary chamber 20 circulates.

According to a preferred feature, which can constitute a completely separate invention, the atmosphere controlling circuit 40 comprises a distributing member 43, which is interposed vertically between the main plate 5 and the receiving face 30A of the pedestal 30 and has, for the one part, an inlet distributor 44 which injects a gaseous flow making up the controlled atmosphere into the secondary chamber 20 and, for the other part, an outlet header 45 which discharges said gaseous flow out of said secondary chamber 20.

The distributing member 43 is preferably accommodated inside the hollow drum 30B of the pedestal 30 and communicates with the secondary chamber 20 by means of holes 46, 47 dedicated to the intake and discharge, respectively, of the gaseous flow.

As can be seen in FIG. 3, said holes 46, 47 are advantageously disposed in the peripheral area of the receiving face 30A of the pedestal 30, typically at a distance from the central axis Z31 which is equal to or greater than 75% of the inner radius of the sleeve 31 (or, substantially equivalently, equal to or greater than 75% of the outer radius of the drum 30B and of the receiving face 30A), in order to not significantly impinge on said receiving face 30A, and in particular in order to free up the central portion of said receiving face 30A that receives the part 4.

An intake manifold 48 connects the recirculation loop 41 to the intake distributor 44 in order to inject the gaseous mixture, in this case coming from the heating apparatus 42, there.

An outlet manifold 49 connects the outlet header 45 to said recirculation loop 41, in this case towards the heating apparatus 42.

With particular preference, the machine 1 could be convertible, in that it could be selectively configured either in a first configuration, in which said machine has a secondary chamber 20 as described above, in order to produce the part 4 inside said secondary chamber 20, or in a second configuration, in which said machine does not have a secondary chamber 20, in order to produce the part 4 directly in the main chamber 2, directly on the main platform 5, notably in order to be able to produce parts which would be too bulky to keep them in the secondary chamber 20 and/or the production of which would not need the chamber to be placed under a particular atmosphere or at a particularly high temperature.

To this end, it would be advantageously possible to provide that the secondary chamber 20 is removable and extractable from the machine 1, such that the main platform 5 can alternatively be either equipped with a secondary chamber 20, to place it in the first configuration, or freed of said secondary chamber 20, to appear bare, in accordance with the second configuration.

Of course, the invention could also relate as such to a module 50 intended to equip a three-dimensional printing machine 1 comprising a main chamber 2 delimited by a first wall 3 provided with a main observation window 11, which is transparent over at least part of the visible light spectrum, inside which main chamber 2 there are a main platform 5, intended to support a part 4 being printed, and a nozzle 6 designed to supply and deposit a printing material 7 in successive layers in order to gradually build up said part 4 supported by the main platform 5, said module 50 comprising a base 51 which makes it possible to fix said module 50 to the main platform 5 of the machine 1, and which bears a secondary chamber 20 delimited by a second wall 21 provided, for the one part, with an insertion orifice 22 allowing the nozzle 6 to enter the secondary chamber 20 in order to be able to create the part 4 within said secondary chamber 20 and, for the other part, a secondary observation window 23, which is transparent over at least part of the visible light spectrum and is designed to be placed facing the main observation window 11 of the machine 1.

The secondary chamber 20 of said module 50 could of course have any feature described above, and in particular have a telescopic arrangement comprising a pedestal 30 fixed to the base 51, a sliding sleeve 31 and a cover 32.

The module 50 will preferably be removable, to this end making use of reversible fixing means, such as screws, to couple the base 51 to the main platform 5 and then decouple said base 51 from the main platform 5, such that the module 50 can be removed and replaced with a smooth plate element in order to reform the bare main platform 5, and vice versa.

To this end, it would of course be possible to provide a kit comprising both the module 50 and the smooth plate element, which are interchangeable for the purpose of changing from the first configuration to the second configuration, and vice versa.

Of course, the invention also relates to a method for using a machine 1 according to the invention, and to a method for reconfiguring a three-dimensional printing machine 1, during which the printing configuration chosen from the first and second aforementioned configurations is selected, and the machine is converted as a result by positioning respectively either the module 50 or the smooth plate element on the machine, more particularly by positioning it on the main platform 5 of said machine 1.

Of course, the invention is in no way limited only to the embodiment variants described in the foregoing, a person skilled in the art being notably capable of isolating or freely combining one or another of the abovementioned features with one another, or of substituting equivalents therefor.

The invention claimed is:

1. A three-dimensional printing machine comprises:

a main chamber which is delimited by a first wall and inside which there are a main platform, configured to support a part being printed, and a nozzle designed to supply and deposit a printing material in successive layers in order to gradually build up the part supported by the main platform; and a drive system for controlling a relative movement of the main platform relative to the nozzle in order that the nozzle can trace a shape of the part, wherein the first wall has at least one main observation window which is transparent over at least part of a visible light spectrum and which allows an observer stationed outside the main chamber to view the main platform, wherein the main chamber contains a secondary chamber of which the volume is strictly less than that of the main chamber and which is delimited by a second wall borne by the main platform, the second wall separating the secondary chamber from the main chamber and having at least one insertion orifice, through which the nozzle enters the secondary chamber in order to be able to deposit the printing material there and thus create the part within the secondary chamber, and at least one secondary observation window, which is transparent over at least part of the visible light spectrum and is placed facing the main observation window such that an observer stationed outside the main chamber can view an interior of the secondary chamber and the part which is being printed in the secondary chamber by direct ocular observation along an optical pathway which passes successively through the main observation window and then the secondary observation window.

2. The three-dimensional printing machine according to claim 1, wherein the second wall comprises:

(i) a pedestal which bears vertically against the main platform and has a horizontal receiving face intended to support the part being printed;

(ii) a sleeve which forms a lateral wall extending vertically from the receiving face of the pedestal, along a closed contour around a vertical central axis normal to the receiving face, and at least one portion of which forms the secondary observation window, and (iii) a cover which caps the sleeve at a vertical distance from the horizontal receiving face of the pedestal, so as to close the secondary chamber, and which has the insertion orifice which allows the nozzle to be engaged inside the secondary chamber.

3. The three-dimensional printing machine according to claim 2, wherein the sleeve forms a ring which is transparent over at least 180 degrees about the vertical central axis.

4. The three-dimensional printing machine according to claim 2, wherein the drive system makes it possible to move the main platform, and consequently the pedestal, in translation along the vertical central axis relative to the cover, and wherein the sleeve forms, with the pedestal, a telescopic structure and is preloaded by one or more springs toward the cover, such that the sleeve can slide relative to the pedestal along the vertical central axis and stay abuttingly pressed against the cover while the main platform is moved relative to the cover, in translation along the vertical central axis.

5. The three-dimensional printing machine according to claim 2, wherein the drive system is designed to be able to generate a relative movement of the main platform, and consequently the pedestal, relative to the cover along a first horizontal axis and along a second horizontal axis perpendicular to the first horizontal axis, and wherein the cover, which bears the nozzle, interacts with the sleeve with horizontal planar contact, such that the cover can slide relative to the sleeve in a horizontal plane parallel to each of the first and second horizontal axes, while still staying in contact with the sleeve and thus keeping the secondary chamber closed, during horizontal relative movements of the main platform with respect to the cover and to the nozzle.

6. The three-dimensional printing machine according to claim 1 further comprising an atmosphere controlling circuit which makes it possible to place the secondary chamber under a controlled atmosphere, a composition and/or a temperature of which differ from a primary atmosphere prevailing in the main chamber, the second wall providing leaktight separation between the secondary chamber and the main chamber.

7. The three-dimensional printing machine according to claim 6, wherein the atmosphere controlling circuit forms a closed recirculation loop, at least one part of which is outside the secondary chamber.

8. The three-dimensional printing machine according to claim 6, wherein the atmosphere controlling circuit comprises a heating apparatus for raising a temperature inside the secondary chamber.

9. The three-dimensional printing machine according to claim 2, further comprising an atmosphere controlling circuit which makes it possible to place the secondary chamber under a controlled atmosphere, a composition and/or a temperature of which differ from a primary atmosphere prevailing in the main chamber, the second wall providing leaktight separation between the secondary chamber and the main chamber, wherein the atmosphere controlling circuit comprises a distributing member, which is interposed vertically between the main plate and the receiving face of the pedestal and has an inlet distributor, which injects a gaseous flow making up the controlled atmosphere into the secondary chamber, and, an outlet header which discharges the gaseous flow out of the secondary chamber.

* * * * *